Aug. 31, 1965 A. BRUEDER 3,203,508
AUTOMATICALLY ADJUSTABLE BRAKE MECHANISM
Filed May 21, 1963 2 Sheets-Sheet 1

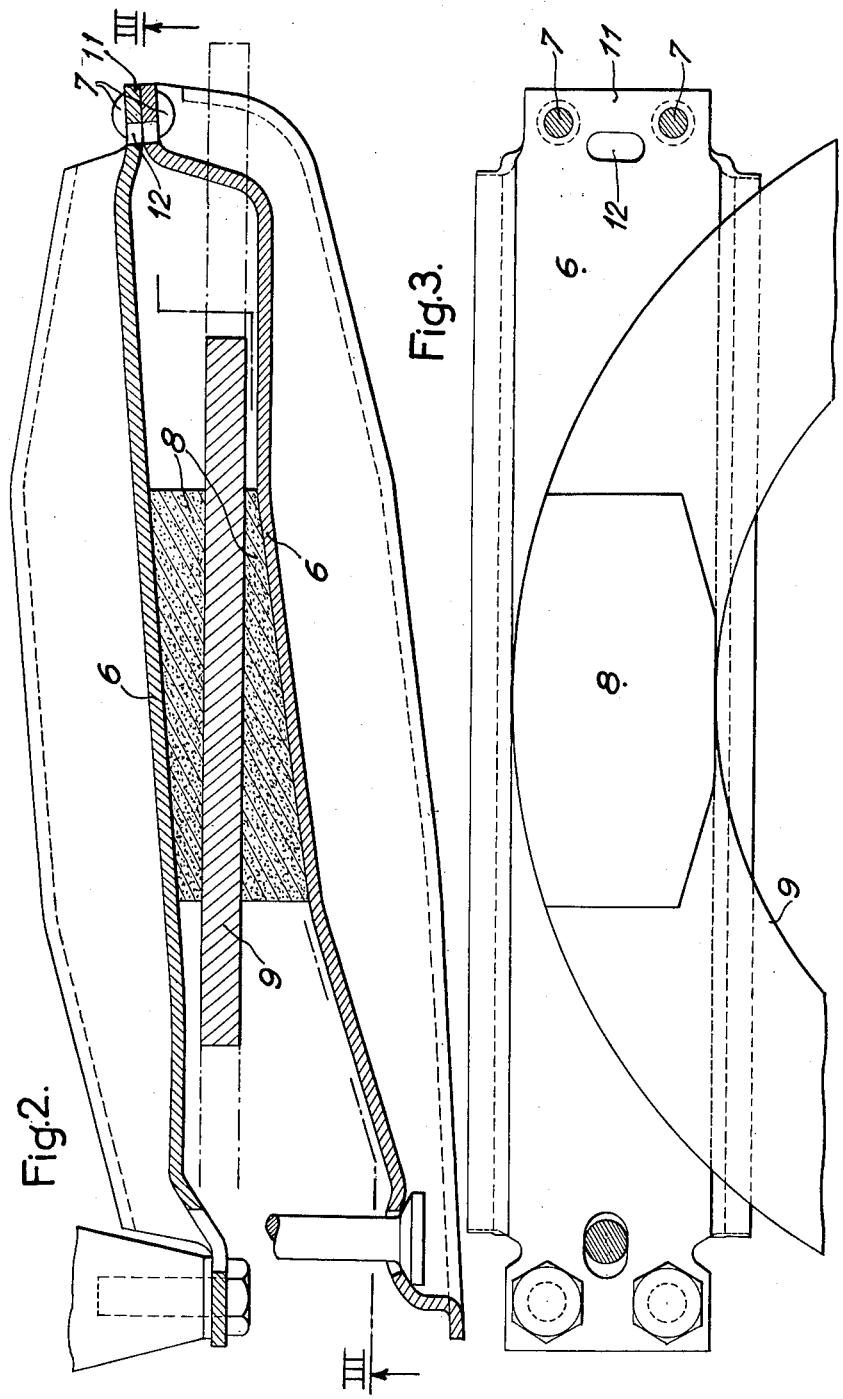

United States Patent Office 3,203,508
Patented Aug. 31, 1965

3,203,508
AUTOMATICALLY ADJUSTABLE BRAKE
MECHANISM
Antoine Brueder, Paris, France, assignor to Societe
Anonyme Andre Citroën, Paris, France
Filed May 21, 1963, Ser. No. 281,891
Claims priority, application France, May 22, 1962,
898,303, Patent 1,334,984
2 Claims. (Cl. 188—73)

It is already known to take up play in movable parts of mechanisms as a function of their wear, notably in the case of brake shoes, according to the degree of wear of brake linings, and as a rule these devices are based on the action of movable members in relation to each other or in relation to the assembly.

In this connection it was observed according to this invention that the property of materials, generally conventional metals, of undergoing a moderate elastic deformation and a considerable plastic deformation, without any substantial reduction of strength, could be used for the same purpose. Thus, members having a relative displacement may be so designed that a permanent set occurs when the displacements exceed a predetermined value, and that an elastic deformation of lower value will cause a slight displacement in the opposite direction when the stress is released.

Thus the play may be taken up without having to provide parts specially designed to this end, this method being particularly applicable in friction systems such as drum brakes, disc brakes or band brakes.

Under these conditions it is advantageous notably to assemble the two sohes of a brake drum by means of a deformable element, this element consisting, if desired, of the part-cylindrical strip portion of the shoe proper. When the control member urges the brake shoe against the brake drum with a certain pressure, it is likely to produce a permanent set in said element if a relatively long stroke was necessary for causing the brake application; after the brake force is released, the simultaneous elastic deformation will cause a slight backward movement of the shoes, and if the brake linings have become worn during the brake application the brake cylinder pressure will operate under permanent set condition of the element, so that the play obtained upon release of the brake control force remains constant and corresponds to the elastic deformation.

In disc brakes, the two shoes are attached at their ends for example by means of rivets, and subjected to a tractive effort in relation to each other at their opposite ends. Upon release of the brake control force, residual elasticity will retract the brake linings from the disc. The same effect may be obtained upon each severe brake application and the play will thus be kept to a substantially constant value.

A clearer understanding of this invention will be had from the following description of two preferred and typical forms of embodiment of the method of this invention which are illustrated diagrammatically by way of example in the accompanying drawings. In the drawings:

FIGURE 2 is a sectional view showing a disc brake of which

FIGURE 3 is another sectional view along line III of FIGURE 2.

Figure 1:
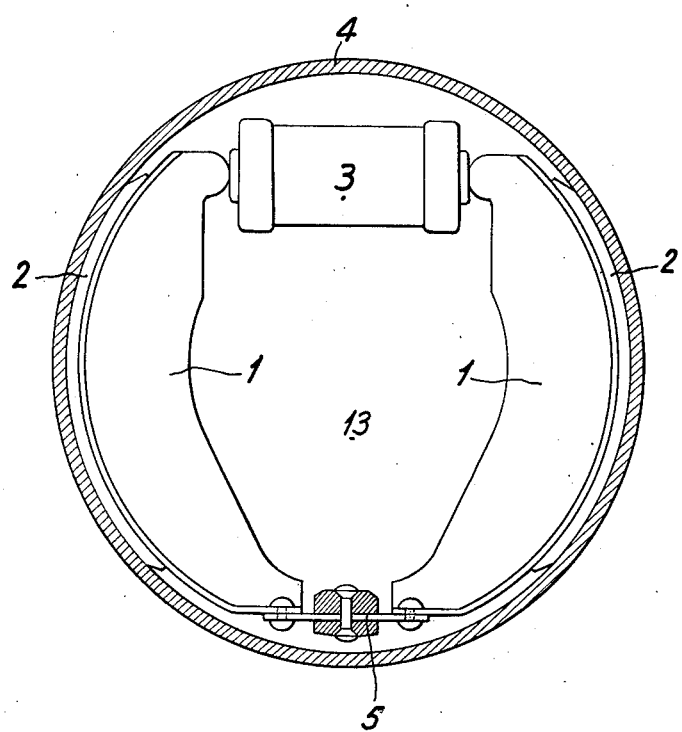
FIGURE 1 is an elevational view showing a drum brake.

Referring first to FIG. 1 of the drawings, the drum brake illustrated therein comprises as usual a pair of brake shoes 1 carrying brake linings 2, and a hydraulic brake control cylinder 3 adapted to move the shoes 1 away from each other for engagement under pressure against the inner cylindrical wall of the brake drum 4, the cylinder 3 being rigid with the brake anchor plate 13. The two brake shoes are assembled to each other at their ends opposite to those acted upon by the hydraulic control cylinder 3, by a deformable element 5, also fixed on the plate 13, consisting if desired of a part of the part-cylindrical peripheral strip of the brake shoes themselves (FIG. 1). During the initial part of a brake application and considering the fact that the shoe 1 (for example the right-hand shoe), is to remain rigid, this shoe will transmit the longitudinal effort directed to the right through the right-hand piston of the brake application member 3 to the flexible part 5 in the form of a torque the moment of which is directed at right angles to the plane of the figure, substantially at point 5. This flexion continues during the brake application and the lower portion of the shoe moves slightly downwards as the upper end moves to the right. During the first brake application with the device properly adjusted, the metal connection 5 attains its yield point or elastic limit when the shoe 1 engages the rotary member 4 to be braked. After a certain amount of wear the shifting of the momentary center of rotation to the right and downwards assumes a relatively high value which it preserves partially in the form of a permanent set subsequent to the brake application, thus producing the desired play take up effect.

When the play take up method of this invention is applied to disc brakes as shown in FIGURES 2 and 3 the brake shoes 6 are assembled by means of rivets 7 at one end and have their opposite ends subjected to a tractive effort in relation to each other. These shoes carry as usual brake linings 8 adapted to clamp the disc 9. When a brake application is effected subsequent to a certain wear it is clear that after this brake application and as a consequence of a permanent set of portion 11, 12 the two shoes 6, 6 remain bent towards each other in relation to the position shown in FIGURE 2. Consequently to said permanent set, the device, at the end of the brake application, releases said part of travel corresponding to the wear and retracts elastically of the only distance corresponding to the desired clearance. Thus, the ends of shoes 6, 6 which are opposite to the portions 11 abut against the two elements of the clamping members clearly shown in the drawing. However, as central portions of the two shoes 6, 6 are bent towards each other, the wear is taken up.

It is advisable to limit the permanent set to a well-defined portion of the brake shoes, in order properly and lastingly to determine the porportions between the value of the elastic deformation eventually obtained, the desired play and the elastic return force.

This positioning of the permanent set may advantageously be obtained by properly shaping the end portions of the brake shoes. In the form of embodiment illustrated in FIGS. 2 and 3 of the drawings, the end of one shoe 6 has a lug configuration 11 and the flexion of this lug is subordinate to its cross-sectional area which may be modified by drilling one or more holes or more or less elongating an aperture such as 12.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. A brake comprising a rotary disc, two brake shoes with opposite linings disposed on either side of said rotary disc parallel to the plane of said disc and adapted to be pressed against said disc, one end of one shoe being pivotally mounted on a fixed pivot pin, the other end of the same shoe being connected through rivet means to the corresponding end of the other shoe, said connected ends having portions of reduced cross-sectional section in relation to the remaining portion of the shoes so as to be the only yielding portions during a brake application, the yielding being elastic if the linings are moderately worn and permanent for any additional movement of said linings towards each other as a consequence of the wear thereof.

2. A brake according to claim 1, wherein said shoes adjacent said connected ends are provided with apertures reducing the cross section of said portions of reduced cross-sectional section.

References Cited by the Examiner

UNITED STATES PATENTS

| | | | |
|---|---|---|---|
| 2,196,396 | 4/40 | Lane | 188—79.5 X |
| 2,285,310 | 6/42 | Strebinger. | |
| 2,743,790 | 5/56 | Bricker | 188—196 X |
| 2,886,140 | 5/59 | Trevaskis | 188—196 X |

ARTHUR L. LA POINT, *Primary Examiner.*

DUANE A. REGER, EUGENE G. BOTZ, *Examiners.*